(12) United States Patent
Lee et al.

(10) Patent No.: US 9,168,913 B2
(45) Date of Patent: Oct. 27, 2015

(54) OIL PUMP SYSTEM OF HYBRID VEHICLE AND METHOD FOR CONTROLLING THE SAME

(71) Applicants: Hyundai Motor Company, Seoul (KR); Kia Motors Corporation, Seoul (KR)

(72) Inventors: Haksung Lee, Gunpo-si (KR); SangLok Song, Hwaseong-si (KR); Ki Nam Kim, Seongnam-si (KR); Seung Hyun Yang, Seoul (KR); Jong Ho Lee, Suwon-si (KR); Jong Hyun Kim, Suwon-si (KR); Jaeshin Yi, Suwon-si (KR); Jang Mi Lee, Tongyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/246,574

(22) Filed: Apr. 7, 2014

(65) Prior Publication Data

US 2015/0019073 A1    Jan. 15, 2015

(30) Foreign Application Priority Data

Nov. 1, 2013    (KR) .................. 10-2013-0131995

(51) Int. Cl.
    *B60W 10/30*    (2006.01)
(52) U.S. Cl.
    CPC .................... *B60W 10/30* (2013.01)
(58) Field of Classification Search
    CPC .......... B60W 10/30; B60K 6/42; B60K 6/485
    USPC ............. 701/36, 48, 22, 104; 477/156, 45, 3, 477/119, 902; 180/65.275, 65.285; 903/903, 904, 919
    See application file for complete search history.

(56) References Cited

U.S. PATENT DOCUMENTS

| 6,840,889 | B2 * | 1/2005 | Aoki et al. .................... 477/156 |
|---|---|---|---|
| 2004/0063539 | A1 * | 4/2004 | Endo et al. ........................ 477/45 |
| 2008/0121464 | A1 * | 5/2008 | Ledger et al. ................. 184/6.13 |
| 2008/0139360 | A1 * | 6/2008 | Hayashi et al. ..................... 477/3 |
| 2009/0118878 | A1 * | 5/2009 | Park ................................ 701/22 |
| 2010/0263951 | A1 * | 10/2010 | Hayashi et al. .......... 180/65.275 |
| 2011/0166727 | A1 * | 7/2011 | Light et al. ...................... 701/22 |

(Continued)

FOREIGN PATENT DOCUMENTS

| JP | 2005-206021 | A | 8/2005 |
|---|---|---|---|
| JP | 2007-198439 | A | 8/2007 |
| JP | 3994969 | B2 | 8/2007 |
| JP | 2009-96326 | A | 5/2009 |
| JP | 4530999 | B2 | 6/2010 |

(Continued)

*Primary Examiner* — Marthe Marc-Coleman
(74) *Attorney, Agent, or Firm* — Morgan, Lewis & Bockius LLP

(57) ABSTRACT

An oil pump system of a hybrid vehicle may include an electric oil pump which supplies operating hydraulic pressure to the transmission based on a speed command; a data detector which detects data for controlling the electric oil pump; and a controller which sets a driving mode of the electric oil pump based on the data detected by the data detector, determines a basic flow rate of the set driving mode, determines a final flow rate by compensating for the basic flow rate, and applies the speed command to the electric oil pump, in which the operating hydraulic pressure is supplied to the transmission only by the electric oil pump, and the speed command is determined based on target hydraulic pressure, an oil temperature, and the final flow rate.

18 Claims, 4 Drawing Sheets

(56) References Cited

U.S. PATENT DOCUMENTS

2012/0141297 A1* 6/2012 Jeong et al. ............... 417/5
2013/0319366 A1* 12/2013 Karasawa ............. 123/196 R

FOREIGN PATENT DOCUMENTS

| KR | 10-1000162 B1 | 12/2010 |
| KR | 10-2012-0063258 A | 6/2012 |

* cited by examiner

OIL PUMP SYSTEM OF HYBRID VEHICLE AND METHOD FOR CONTROLLING THE SAME

CROSS-REFERENCE TO RELATED APPLICATION

The present application claims priority to Korean Patent Application No. 10-2013-0081598 filed on Jul. 11, 2013 and Korean Patent Application No. 10-2013-0131995 filed on Nov. 1, 2013, the entire contents of which is incorporated herein for all purposes by this reference.

BACKGROUND OF THE INVENTION

1. Field of the Invention

The present invention relates to an oil pump system of a hybrid vehicle and a method for controlling the same, and more particularly, to an oil pump system of a hybrid vehicle which is provided to supply hydraulic pressure to a transmission using only an electric oil pump, and a method for controlling the same.

2. Description of Related Art

As well known, a hybrid vehicle uses both an engine and a battery power source. That is, the hybrid vehicle efficiently combines power of the engine and power of a motor, and uses the combined power.

An automatic transmission is typically mounted in the hybrid vehicle, and in order to supply operating hydraulic pressure to the automatic transmission, an oil pump system, which uses both a mechanical oil pump (MOP) and an electric oil pump (EOP), is mainly used.

The mechanical oil pump is driven by power of the engine so as to supply oil to the automatic transmission. Therefore, when an operation of the engine stops, the mechanical oil pump also stops such that oil is not supplied. Thus, the electric oil pump, which is driven separately from the engine, is mounted. For example, an oil pump system of a hybrid vehicle in the related art divides a section into a stop section, a low speed section, and a high speed section in accordance with a running state (speed) of the hybrid vehicle, and a method for controlling the oil pump may be performed by operating only the electric oil pump in the stop section, simultaneously operating the mechanical oil pump and the electric oil pump in the low speed section, and operating only the mechanical oil pump in the high speed section. That is, the electric oil pump of the oil pump system in the related art is used to supplement insufficient operating hydraulic pressure of the mechanical oil pump.

Because the mechanical oil pump is operated at all times when the engine starts, an unnecessary power loss may be caused, thereby degrading fuel efficiency. In addition, when the mechanical oil pump and the electric oil pump are simultaneously used, production costs may be increased.

Therefore, it is necessary to eliminate the mechanical oil pump, and a method of supplying oil to the automatic transmission by solely driving the electric oil pump is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an oil pump system of a hybrid vehicle and a method for controlling the same, which stably supply operating hydraulic pressure to a transmission by solely driving an electric oil pump.

In an aspect of the present invention, an oil pump system of a hybrid vehicle, which supplies operating hydraulic pressure to a transmission of the hybrid vehicle may include an electric oil pump which supplies the operating hydraulic pressure to the transmission based on a speed command, a data detector which detects data for controlling the electric oil pump, and a controller which sets driving modes of the electric oil pump based on the data detected by the data detector, determines a basic flow rate of the set driving modes, determines a final flow rate by compensating for the basic flow rate, and applies the speed command to the electric oil pump, wherein the operating hydraulic pressure is supplied to the transmission only by the electric oil pump, and the speed command is determined based on target hydraulic pressure, an oil temperature, and the final flow rate.

The driving modes may include a first control mode that is set under a first condition in which the hybrid vehicle stops, and a second control mode that is set under a second condition in which the hybrid vehicle runs.

The first condition is satisfied in a case in which a brake is turned on and a vehicle speed is 0, or a gear stage is a parking stage (P-stage) or a neutral stage (N-stage).

The second condition is satisfied in a case in which a brake is turned off or a vehicle speed is greater than 0, and a gear stage is a driving stage (D-stage) or a reverse driving stage (R-stage).

The driving modes further may include a third control mode that is set under a condition in which the hybrid vehicle begins to run, and the third control mode is maintained for a predetermined time.

The controller determines the basic flow rate of the set driving modes from a basic flow rate map with respect to a relationship among the oil temperature, the target hydraulic pressure, and the basic flow rate, which are stored for each of the driving modes.

The controller determines a compensation flow rate that is required when the transmission is cooled, lubricated, slips, and may have an oil leakage, and determines the final flow rate by adding the compensation flow rate to the basic flow rate.

The compensation flow rate is determined using a compensation flow rate map that may include a two-dimensional map in which information on a relationship among the oil temperature, heat generation, and the compensation flow rate is stored in consideration of cooling, lubrication, and slip of the transmission.

The controller determines the speed command from a speed command map, and the speed command map is a three-dimensional map with respect to a relationship among the target hydraulic pressure, the oil temperature, and the final flow rate, and the speed command is stored.

The electric oil pump is continuously operated from when the hybrid vehicle starts to when the hybrid vehicle is turned off.

In another aspect of the present invention, a method for controlling an oil pump system of a hybrid vehicle which supplies operating hydraulic pressure to a transmission of the hybrid vehicle, may include setting driving modes of an electric oil pump based on data detected by a data detector, determining a basic flow rate of the set driving modes, determining a final flow rate based on the basic flow rate, determining a speed command of the electric oil pump based on target hydraulic pressure, an oil temperature, and the final flow rate, and controlling drive of the electric oil pump based on the determined speed command.

The driving modes may include a first control mode that is set under a first condition in which the hybrid vehicle stops, and a second control mode that is set under a second condition in which the hybrid vehicle runs.

The first condition is satisfied in a case in which a brake is turned on and a vehicle speed is 0, or a gear stage is a parking stage (P-stage) or a neutral stage (N-stage).

The second condition is satisfied in a case in which a brake is turned off or a vehicle speed is greater than 0, and a gear stage is a driving stage (D-stage) or a reverse driving stage (R-stage).

The driving modes further may include a third control mode that is set under a condition in which the hybrid vehicle begins to run, and the third control mode is maintained for a predetermined time.

The basic flow rate is determined from a basic flow rate map with respect to a relationship among the oil temperature, the target hydraulic pressure, and the basic flow rate, which are stored for each of the driving modes.

The method may further may include determining a compensation flow rate that is required when the transmission is cooled, lubricated, slips, and may have an oil leakage, wherein the final flow rate is determined by adding the compensation flow rate to the basic flow rate.

The compensation flow rate is determined using a compensation flow rate map that may include a two-dimensional map in which information on a relationship among the oil temperature, heat generation, and the compensation flow rate is stored in consideration of cooling, lubrication, and slip of the transmission.

The speed command is determined from a three-dimensional map with respect to a relationship among the target hydraulic pressure, the oil temperature, and the final flow rate, and the speed command is stored.

According to the exemplary embodiment of the present invention, the electric oil pump is solely driven, thereby improving fuel efficiency, and reducing production costs.

In addition, the three-dimensional map with respect to the target hydraulic pressure, the oil temperature, the final flow rate, and the speed command of the electric oil pump is used, thereby accurately and stably supplying a required amount of operating hydraulic pressure to the transmission.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
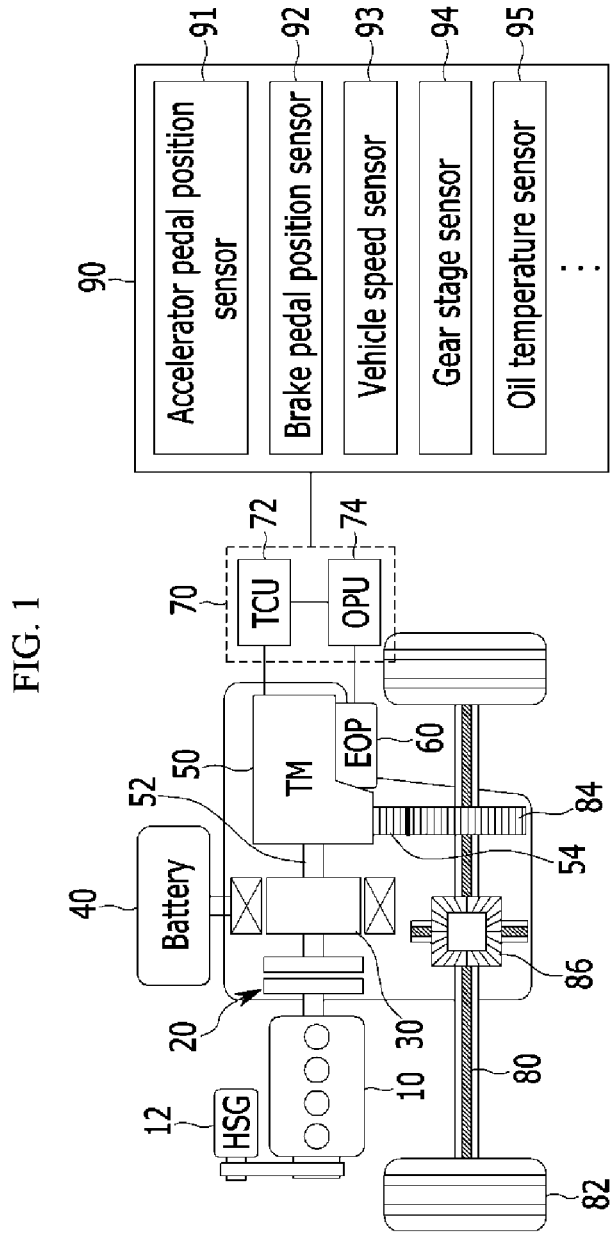
FIG. 1 is a configuration diagram of an oil pump system of a hybrid vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. However, the present invention is not limited to the exemplary embodiments described herein, and may be implemented in various different forms.

A part irrelevant to the description will be omitted to clearly describe the present disclosure, and the same or similar elements will be designated by the same reference numerals throughout the specification.

In addition, each configuration illustrated in the drawings is arbitrarily shown for understanding and ease of description, but the present invention is not limited thereto.

Throughout the specification and the claims, unless explicitly described to the contrary, the word "include" and variations such as "includes" or "including" will be understood to imply the inclusion of stated elements but not the exclusion of any other elements.

FIG. 1 is a configuration diagram of an oil pump system of a hybrid vehicle according to an exemplary embodiment of the present invention.

Referring to FIG. 1, an oil pump system of a hybrid vehicle according to an exemplary embodiment of the present invention includes a transmission 50, an electric oil pump (EOP) 60, a controller 70, and a data detector 90. In addition, a power train system of the hybrid vehicle includes an engine 10, a hybrid starter and generator (HSG) 12, an engine clutch 20, a drive motor 30, a battery 40, the transmission 50, and an axle 80.

During power transmission of the hybrid vehicle, power generated by the engine 10 or the drive motor 30 is selectively transmitted to an input shaft 52 of the transmission 50, and power outputted from an output end 54 of the transmission 50 is transmitted to the axle 80 via a final reduction gear device 84 and a differential gear device 86. As the axle 80 rotates wheels 82, the hybrid vehicle runs by the power generated by the engine 10 or the drive motor 30.

The HSG 12 is operated as a motor so as to start the engine 10, or operated as a generator so as to charge the battery 40 when a surplus output is produced in a state in which the engine 10 is operated.

The engine clutch 20 is mounted between the engine 10 and the drive motor 30 so as to connect or disconnect power.

The battery 40 stores a high voltage, and supplies a driving voltage to the drive motor 30, and is charged with regenerative energy generated by the drive motor 30 when the hybrid vehicle coasts.

Because power transmission and regenerative brake of the hybrid vehicle are obvious to those skilled in the technical field to which the present invention pertains (hereinafter, referred to as those skilled in the art), a more detailed description thereof will be omitted.

The transmission 50 is an apparatus for performing gear shifting by changing gear ratios that are connected from the input shaft 52 to the output end 54. In addition, the transmission 50 performs gear shifting in accordance with operations of a plurality of friction elements including at least one brake, and at least one clutch. The plurality of friction elements is operated to be coupled and released by operating hydraulic pressure that is supplied to the transmission 50.

The electric oil pump 60 pumps oil so as to supply operating hydraulic pressure to the engine clutch 20 and the transmission 50. The electric oil pump 60 is continuously operated from when the hybrid vehicle is turned on to when the hybrid vehicle is turned off. That is, the electric oil pump 60 is operated at all times because a mechanical oil pump is eliminated.

The data detector 90 detects data for controlling the electric oil pump 60, and the data detected by the data detector 90 is transmitted to the controller 70.

The data detector 90 may include an accelerator pedal position sensor 91, a brake pedal position sensor 92, a vehicle speed sensor 93, a gear stage sensor 94, and an oil temperature sensor 95.

The accelerator pedal position sensor 91 detects a degree with which a driver presses an accelerator pedal. That is, the accelerator pedal position sensor 91 detects data regarding the driver's intention of accelerating a vehicle.

The brake pedal position sensor 92 detects whether a brake pedal is pressed or not. That is, the brake pedal position sensor 92 detects the driver's intention of accelerating a vehicle together with the accelerator pedal position sensor 91.

The vehicle speed sensor 93 detects a vehicle speed, and is mounted to a wheel of a vehicle. Contrary to this, a vehicle speed may be calculated based on a global positioning system (GPS) signal received by the GPS.

Meanwhile, a target gear stage may be calculated based on a signal of the accelerator pedal position sensor 91 and a signal of the vehicle speed sensor 93 using a gear shift pattern, and gear shifting to the target gear stage is controlled. That is, in the case of an automatic transmission including a plurality of planetary gear sets and a plurality of friction elements, hydraulic pressure, which is supplied to the plurality of friction elements or released from the plurality of friction elements, is adjusted. In addition, in the case of a double clutch transmission, a current, which is applied to a plurality of synchronizers and actuators, is controlled.

The gear stage sensor 94 detects a gear stage that is currently engaged. The oil temperature sensor 95 detects a temperature of oil in the transmission 50.

The controller 70 may include a transmission control unit (TCU) 72, and an electric oil pump unit (OPU) 74. A method for controlling an oil pump system of a hybrid vehicle according to an exemplary embodiment of the present invention may be performed by the transmission control unit 72, and the electric oil pump unit 74.

The transmission control unit 72 is an apparatus for controlling torque of the transmission 50, operations of the plurality of friction elements, and the like. The transmission control unit 72 may set a driving mode of the electric oil pump 60 based on data detected by the data detector 90, calculate a speed command based on the set driving mode, and transmit the speed command to the electric oil pump unit 74.

To this end, the transmission control unit 72 may be implemented as at least one processor that is operated by a predetermined program, and the predetermined program may be programmed in order to perform each step of the method for controlling the oil pump system of a hybrid vehicle according to the exemplary embodiment of the present invention.

The electric oil pump unit 74 is connected to the electric oil pump 60, and controls a drive of the electric oil pump 60 based on the speed command.

Several processes of the method for controlling the electric oil pump of a hybrid vehicle according to the exemplary embodiment of the present invention, which will be described below, may be performed by the transmission control unit 72, and several other processes of the method may be performed by the electric oil pump unit 74. Therefore, since the method for controlling the electric oil pump of a hybrid vehicle according to the exemplary embodiment of the present invention may be described by defining the transmission control unit 72 and the electric oil pump unit 74 as a single controller 70, the transmission control unit 72 and the electric oil pump unit 74 will be referred to as the controller 70 in the present specification.

Figure 2:
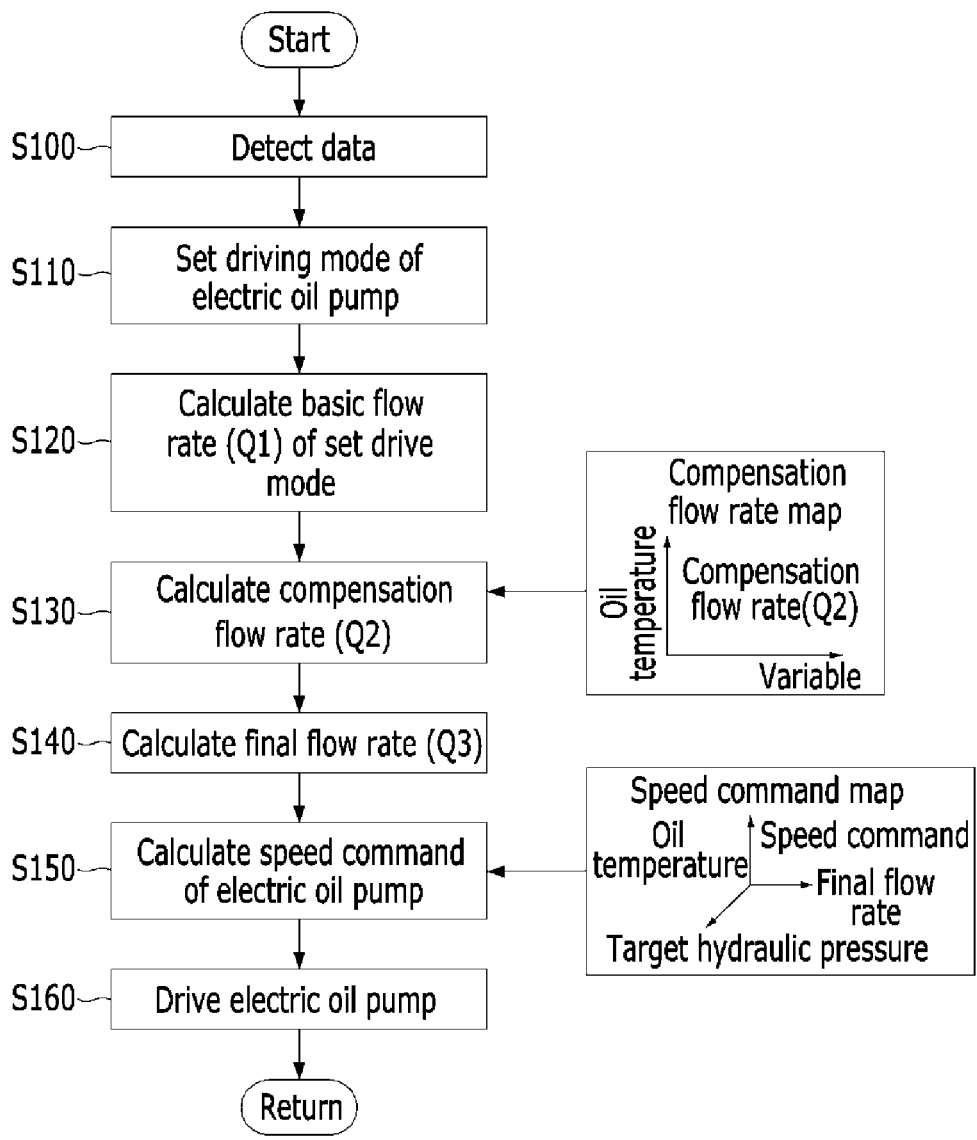
FIG. 2 is a flowchart of a method for controlling an oil pump system of a hybrid vehicle according to an exemplary embodiment of the present invention.

FIG. 2 is a flowchart of a method for controlling the oil pump system of a hybrid vehicle according to the exemplary embodiment of the present invention.

As illustrated in FIG. 2, a method for controlling the oil pump system of a hybrid vehicle according to the exemplary embodiment of the present invention starts with detecting data for controlling the electric oil pump 60 (S100).

The controller 70 sets a driving mode of the electric oil pump 60 based on the data (S110).

Figure 3:
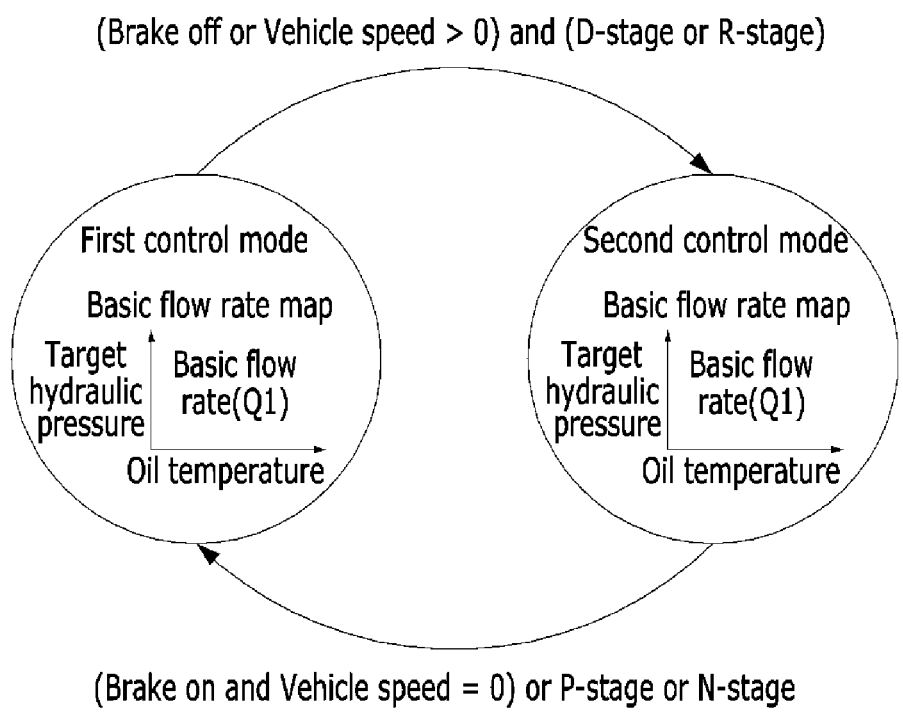
FIGS. 3 and 4 are views illustrating driving modes of the electric oil pump according to the exemplary embodiment of the present invention.
Figure 4:
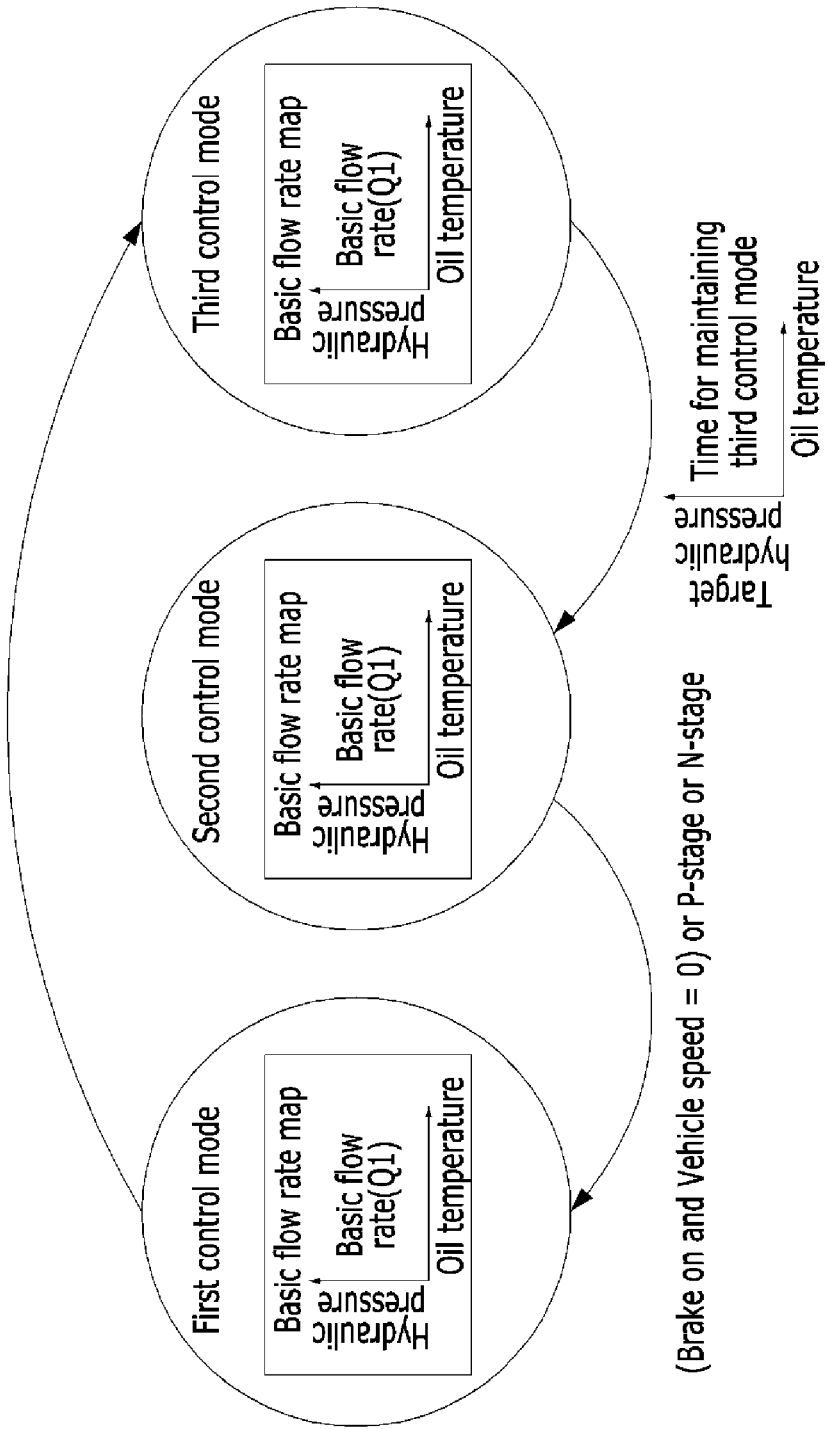

FIGS. 3 and 4 are views illustrating driving modes of the electric oil pump according to the exemplary embodiment of the present invention.

As illustrated in FIG. 3, the driving mode includes a first control mode, and a second control mode.

The first control mode is a mode in which the electric oil pump 60 is driven in a state in which the hybrid vehicle stops. The first control mode is a mode in which only minimally necessary hydraulic pressure is supplied in order to minimize electric power consumption. The controller 70 drives the electric oil pump in the first control mode under a condition in which the hybrid vehicle stops. For example, the condition may be satisfied in a case in which the brake is turned on and the vehicle speed is 0, or the gear stage is a parking stage (P-stage) or a neutral stage (N-stage).

The second control mode is a mode in which the electric oil pump 60 is driven in a state in which the hybrid vehicle runs. The controller 70 drives the electric oil pump 60 in the second control mode under a condition in which the hybrid vehicle starts or the hybrid vehicle runs. For example, the condition may be satisfied in a case in which the brake is turned off or the vehicle speed is greater than 0, and the gear stage is a driving stage (D-stage) or a reverse driving stage (R-stage).

As illustrated in FIG. 4, the driving mode may further include a third control mode.

The third control mode is a mode in which the electric oil pump 60 is driven at a high speed in a state in which the hybrid vehicle begins to run. The third control mode is a mode in which hydraulic pressure responsiveness is secured by instantaneously supplying hydraulic pressure to the transmission 50 for a predetermined time.

That is, the third control mode may quickly make a required pressure state by instantaneously pumping oil at a high pressure for a short time, in consideration of a case in which when the first control mode is directly converted into the second control mode, a rotation speed of the electric oil pump 60 may not follow a speed command calculated in the second control mode (for example, in a low voltage state of the battery).

The controller 70 may drive the electric oil pump 60 in the third control mode under a condition in which the hybrid vehicle is turned on or the hybrid vehicle begins to run. The condition may be satisfied in a case in which in a state in which the first control mode is set, the brake is turned off or the vehicle speed is greater than 0, and the gear stage is a driving stage (D-stage) or a reverse driving stage (R-stage).

The controller 70 may calculate the predetermined time (time for maintaining the third control mode) based on a two-dimensional map with respect to a relationship among an oil temperature, target hydraulic pressure, and the predetermined time. When the predetermined time is passed, the controller 70 converts the driving mode from the third control mode to the second control mode.

After the driving mode of the electric oil pump 60 is set in step S110, the controller 70 calculates a basic flow rate Q1 of the set driving mode from a basic flow rate map (S120). Here, the basic flow rate map may be a two-dimensional map in which the oil temperature and the target hydraulic pressure are used as variables, and information on the basic flow rate is stored for each driving mode. That is, the controller 70 may calculate the basic flow rate Q1 based on the current oil temperature and target hydraulic pressure using information of the basic flow rate map.

In the two-dimensional map of the first control mode, the basic flow rate Q1 may be set as a minimally maintained flow rate that is necessary in a state in which the hybrid vehicle stops. In the two-dimensional map of the second control mode, the basic flow rate Q1 may be set as a flow rate that enables torque transmission in a state in which the hybrid vehicle runs. In the two-dimensional map of the third control mode, the basic flow rate Q1 may be set as a flow rate for securing hydraulic pressure responsiveness in a state in which the hybrid vehicle begins to run.

The controller 70 may calculate a compensation flow rate Q2 based on cooling, lubrication, slip, and oil leakage of the engine clutch 20, the drive motor 30, and the transmission 50 (S130).

Using a compensation flow rate map, the controller 70 may calculate the compensation flow rate Q2 that is required when the transmission 50 is cooled, lubricated, slips, and has an oil leakage. The compensation flow rate map may include a two-dimensional map in which information on a relationship among the oil temperature, heat generation, and the compensation flow rate is stored in consideration of the cooling, the lubrication, and the slip, and a two-dimensional map in which information on a relationship among the oil temperature, valve control pressure, and the compensation flow rate is stored in consideration of the oil leakage. Here, the method of calculating the compensation flow rate by the controller 70 using the compensation flow rate map is just an example, and the present invention is not limited thereto.

For example, when the compensation flow rate Q2 is calculated, the controller 70 may consider heat generation $X_1$ of a drive motor system (motor per se, bearing, or the like), heat generation $X_2$ of an transmission output system (differential gear device, bearing, or the like), heat generation $X_3$ of a bushing system (shaft bushing or the like), heat generation $X_4$ of a planetary gear system (planetary gear, needle roller bearing, or the like), heat generation $X_5$ when a plurality of friction elements (clutch and brake) slips, or the like.

In addition, when the compensation flow rate Q2 is calculated, the controller 70 may consider an oil leakage in the transmission 50 due to an excessive control during gear shifting. That is, the controller 70 may calculate the compensation flow rate based on oil leakages in a plurality of valves that is provided in the transmission 50. Specific description regarding variables, symbols, constants, and the like in various equations used in the present specification, which are obvious to those skilled in the art, will be omitted for convenience of description.

The heat generation $X_1$ of the drive motor system may be calculated by an equation of $X_1=|w_1*(|T_1|*k_{11}+k_{12})|$. Here, "| |" refers to an absolute value function, $w_1$ refers to a rotation speed of the drive motor, $T_1$ refers to torque of the drive motor, $k_{11}$ refers to a drive motor loss rate, and $k_{12}$ refers to a bearing drag constant of the drive motor. The drive motor loss rate has a value between 0 and 1, and may be calculated from a two-dimensional map with respect to a relationship among the rotation speed of the drive motor, an absolute value of the torque of the drive motor, and the drive motor loss rate.

The heat generation $X_2$ of the transmission output system may be calculated by an equation of $X_2=No*(|T_2|*k_{21}+k_{22})$. Here, No refers to a rotation speed of the output shaft of the transmission, $T_2$ refers to torque of the output shaft of the transmission, $K_{21}$ refers to a loss rate constant of the output shaft, and $K_{22}$ refers to a bearing drag constant of the output shaft.

The heat generation $X_3$ of the bushing system may be calculated by an equation of $X_3=v_3*k_3$. Here, $v_3$ refers to a relative speed of an input shaft bushing of the transmission, and $k_3$ refers to drag of the bushing. The drag of the bushing has a value between 0 and 10, and may be calculated from a two-dimensional map with respect to a relationship among the oil temperature, the relative speed of the bushing, and the drag of the bushing.

The heat generation $X_4$ of the planetary gear system may be calculated by an equation of $X_4=|w_4*(|T_4|*k_{41}+k_{42})|$. Here, $w_4$ refers to a rotation speed of a pinion gear, $T_4$ refers to transmission torque of the pinion gear, $k_{41}$ refers to a loss rate constant of the pinion gear, and $k_{42}$ refers to a bearing drag constant of a planetary gear system. The loss rate constant $k_{41}$ of the pinion gear and the bearing drag constant $k_{42}$ of the planetary gear system may be defined, respectively, for each of a plurality of planetary gear sets.

The heat generation $X_5$ when a single friction element slips may be calculated by an equation of $X_5=v_5*(P_5-k_{51})*k_{52}$. Here, $v_5$ refers to a relative speed of the friction element, $P_5$ refers to control pressure of the friction element, $k_{51}$ refers to a kiss point pressure constant of the friction element, and $k_{52}$ refers to an area constant of the friction element. The heat generation when each friction element slips may be calculated using a method identical to the method of calculating the heat generation when a single friction element slips.

Here, the controller 70 may determine a maximum value among the respective compensation flow rates, which are calculated based on the variables, as the compensation flow rate Q2.

Thereafter, the controller 70 calculates a final flow rate Q3 by adding the compensation flow rate Q2 to the basic flow rate Q1 (S140).

The controller 70 calculates a speed command of the electric oil pump 60 from a speed command map (S150). Here, the speed command map may be a three-dimensional map in which the target hydraulic pressure, the oil temperature, and the final flow rate are used as variables, and information on the speed command of the electric oil pump is stored. That is, the controller 70 may calculate the speed command of the electric oil pump based on the target hydraulic pressure, the oil temperature, and the final flow rate, using information of the speed command map.

The controller 70 controls a drive of the electric oil pump 60 based on the calculated speed command (S160). When the controller 70 is divided into the transmission control unit 72 and the electric oil pump unit 74, the transmission control unit 70 calculates the speed command and transmits the speed command to the electric oil pump unit 74, and the electric oil pump unit 74 may drive the electric oil pump 60 in accordance with the speed command.

Accordingly, according to the exemplary embodiment of the present invention, the electric oil pump is solely driven, thereby improving fuel efficiency and reducing production costs.

In addition, the three-dimensional map with respect to the target hydraulic pressure, the final flow rate, and the speed command of the electric oil pump is used, thereby accurately and stably supplying a required amount of operating hydraulic pressure to the transmission.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An oil pump system of a hybrid vehicle, which supplies operating hydraulic pressure to a transmission of the hybrid vehicle, the oil pump system comprising:
   an electric oil pump which supplies the operating hydraulic pressure to the transmission based on a speed command;
   a data detector which detects data for controlling the electric oil pump; and
   a controller which sets driving modes of the electric oil pump based on the data detected by the data detector, determines a basic flow rate of the set driving modes, determines a final flow rate by compensating for the basic flow rate, and applies the speed command to the electric oil pump,
   wherein the operating hydraulic pressure is supplied to the transmission only by the electric oil pump, and the speed command is determined based on target hydraulic pressure, an oil temperature, and the final flow rate,
   wherein the electric oil pump is continuously operated from when the hybrid vehicle starts to when the hybrid vehicle is turned off.

2. The oil pump system of claim 1,
   wherein the driving modes include a first control mode that is set under a first condition in which the hybrid vehicle stops, and a second control mode that is set under a second condition in which the hybrid vehicle runs.

3. The oil pump system of claim 2, wherein the first condition is satisfied in a case in which a brake is turned on and a vehicle speed is 0, or a gear stage is a parking stage (P-stage) or a neutral stage (N-stage).

4. The oil pump system of claim 2, wherein the second condition is satisfied in a case in which a brake is turned off or a vehicle speed is greater than 0, and a gear stage is a driving stage (D-stage) or a reverse driving stage (R-stage).

5. The oil pump system of claim 2,
   wherein the driving modes further includes a third control mode that is set under a condition in which the hybrid vehicle begins to run, and
   wherein the third control mode is maintained for a predetermined time.

6. The oil pump system of claim 1, wherein the controller determines the basic flow rate of the set driving modes from a basic flow rate map with respect to a relationship among the oil temperature, the target hydraulic pressure, and the basic flow rate, which are stored for each of the driving modes.

7. The oil pump system of claim 1, wherein the controller determines a compensation flow rate that is required when the transmission is cooled, lubricated, slips, and has an oil leakage, and determines the final flow rate by adding the compensation flow rate to the basic flow rate.

8. The oil pump system of claim 7, wherein the compensation flow rate is determined using a compensation flow rate map that includes a two-dimensional map in which information on a relationship among the oil temperature, heat generation, and the compensation flow rate is stored in consideration of cooling, lubrication, and slip of the transmission.

9. The oil pump system of claim 1,
   wherein the controller determines the speed command from a speed command map, and
   wherein the speed command map is a three-dimensional map with respect to a relationship among the target hydraulic pressure, the oil temperature, and the final flow rate, and the speed command is stored.

10. A method for controlling an oil pump system of a hybrid vehicle which supplies operating hydraulic pressure to a transmission of the hybrid vehicle, the method comprising:
    setting driving modes of an electric oil pump based on data detected by a data detector;
    determining a basic flow rate of the set driving modes;
    determining a final flow rate based on the basic flow rate;
    determining a speed command of the electric oil pump based on target hydraulic pressure, an oil temperature, and the final flow rate; and
    controlling by a controller, drive of the electric oil pump based on the determined speed command,
    wherein the oil pump system comprises:
      the electric oil pump which supplies the operating hydraulic pressure to the transmission based on the speed command;
      the data detector which detects the data for controlling the electric oil pump; and
      the controller which sets the driving modes of the electric oil pump based on the data detected by the data detector, determines the basic flow rate of the set driving modes, determines the final flow rate by compensating for the basic flow rate, and applies the speed command to the electric oil pump,
    wherein the operating hydraulic pressure is supplied to the transmission only by the electric oil pump, and
    wherein the electric oil pump is continuously operated from when the hybrid vehicle starts to when the hybrid vehicle is turned off.

11. The method of claim 10, wherein the driving modes include a first control mode that is set under a first condition in which the hybrid vehicle stops, and a second control mode that is set under a second condition in which the hybrid vehicle runs.

12. The oil pump system of claim 11, wherein the first condition is satisfied in a case in which a brake is turned on and a vehicle speed is 0, or a gear stage is a parking stage (P-stage) or a neutral stage (N-stage).

13. The oil pump system of claim 11, wherein the second condition is satisfied in a case in which a brake is turned off or a vehicle speed is greater than 0, and a gear stage is a driving stage (D-stage) or a reverse driving stage (R-stage).

14. The method of claim 11, wherein the driving modes further include a third control mode that is set under a condition in which the hybrid vehicle begins to run, and the third control mode is maintained for a predetermined time.

15. The method of claim 10, wherein the basic flow rate is determined from a basic flow rate map with respect to a relationship among the oil temperature, the target hydraulic pressure, and the basic flow rate, which are stored for each of the driving modes.

16. The method of claim 10, further comprising:
 determining a compensation flow rate that is required when the transmission is cooled, lubricated, slips, and has an oil leakage,
 wherein the final flow rate is determined by adding the compensation flow rate to the basic flow rate.

17. The oil pump system of claim 16, wherein the compensation flow rate is determined using a compensation flow rate map that includes a two-dimensional map in which information on a relationship among the oil temperature, heat generation, and the compensation flow rate is stored in consideration of cooling, lubrication, and slip of the transmission.

18. The method of claim 10, wherein the speed command is determined from a three-dimensional map with respect to a relationship among the target hydraulic pressure, the oil temperature, and the final flow rate, and the speed command is stored.

* * * * *

UNITED STATES PATENT AND TRADEMARK OFFICE
CERTIFICATE OF CORRECTION

| | | |
|---|---|---|
| PATENT NO. | : 9,168,913 B2 | Page 1 of 1 |
| APPLICATION NO. | : 14/246574 | |
| DATED | : October 27, 2015 | |
| INVENTOR(S) | : Haksung Lee et al. | |

It is certified that error appears in the above-identified patent and that said Letters Patent is hereby corrected as shown below:

On the title page

Item 30 Foreign Application Priority Data:

Please insert the following:

-- Jul. 11, 2013 (KR) ………………….. 10-2013-0081598 --.

Signed and Sealed this
Third Day of May, 2016

Michelle K. Lee
*Director of the United States Patent and Trademark Office*